United States Patent [19]

Landino

[11] 4,334,182
[45] Jun. 8, 1982

[54] MOTOR CONTROL SYSTEM

[75] Inventor: Paul J. Landino, Orange, Conn.

[73] Assignee: Zero-Max Industries, Incorporated, Minneapolis, Minn.

[21] Appl. No.: 92,746

[22] Filed: Nov. 9, 1979

[51] Int. Cl.[3] ............................................. H02P 5/40
[52] U.S. Cl. .................................. 318/808; 318/803; 318/798
[58] Field of Search ...................... 318/779, 798–803, 318/805, 807–812

[56] References Cited

U.S. PATENT DOCUMENTS

| 3,402,336 | 9/1968 | Risberg | 318/803 |
| 3,594,623 | 7/1971 | Lamaster | 318/779 X |
| 3,819,992 | 6/1974 | Opal | 318/808 |
| 3,971,972 | 7/1976 | Stich | 318/811 |
| 4,099,108 | 7/1978 | Okawa et al. | 318/808 |

Primary Examiner—David Smith, Jr.
Assistant Examiner—Gene Z. Rubinson
Attorney, Agent, or Firm—Milton E. Gilbert; Gary E. Ross

[57] ABSTRACT

A motor speed control system (controller) for controlling the speed of an AC motor. The invention provides sufficient voltage at low motor speeds to overcome the high resistance of fractional H.P. motors, which effects low speed operation, i.e., the ability to provide constant load torque. With the present invention an output frequency voltage offset is provided in a non-linear fashion so that desired load torque is developed over the entire speed range of the control system.

8 Claims, 10 Drawing Figures

MOTOR CONTROL SYSTEM

BACKGROUND OF THE INVENTION

This invention is directed to a motor control system and more particularly to a motor control system for developing full load torque with motors which exhibit high resistance. In attempting to apply variable speed inverters, (i.e., converters of DC to AC) to fractional horsepower 3φ AC induction motors (i.e., less than 1 HP), it has been found that the motor would tend to stall out at low speeds while attempting to provide full load torque, whereas high horsepower motors (e.g., 1 HP and up) would not encounter such difficulties.

In studying the problem, it was discovered that fractional horsepower motors exhibit a high resistance. In comparison with high horsepower motors. Accordingly, in order to be able to utilize inverters in a manner that full load torque and current could be provided over the entire speed range, it was necessary to overcome the peculiarity of high resistance apparently common to fractional horsepower motors. The present invention solves the foregoing problem by creating an offset voltage in a non-linear fashion to provide constant torque over the entire speed range of the control system.

BRIEF DESCRIPTION OF THE INVENTION

The invention disclosed herein is a variable frequency motor speed control system which is particularly suited to insuring constant output torque is available from a motor over the entire control range of the control system.

With this system a three phase (φ)AC fractional horse power (HP) induction or synchronous motor (e.g., $\frac{3}{4}$, $\frac{1}{2}$, $\frac{1}{4}$ HP motor) may be controlled to provide full load torque at any operational speed.

To achieve the above, the system includes a DC power rectifier module (sub-system) for converting AC to DC. The output voltage is applied to an output driver module which is connected to drive the motor. The output voltage applied to the motor is controlled by an analog and digital control module and a driver control module in order to alter the signal applied to the motor so as to adjust the motor speed. In addition to the above to overcome the high resistance of fractional horsepower motors the controller (motor control system) includes means for causing a low speed offset voltage to be generated in a non-linear fashion so that maximum rated motor current is developed whereby high output torque is achieved over the entire speed range of the motor.

DETAILED DESCRIPTION OF THE INVENTION

Figure 1:
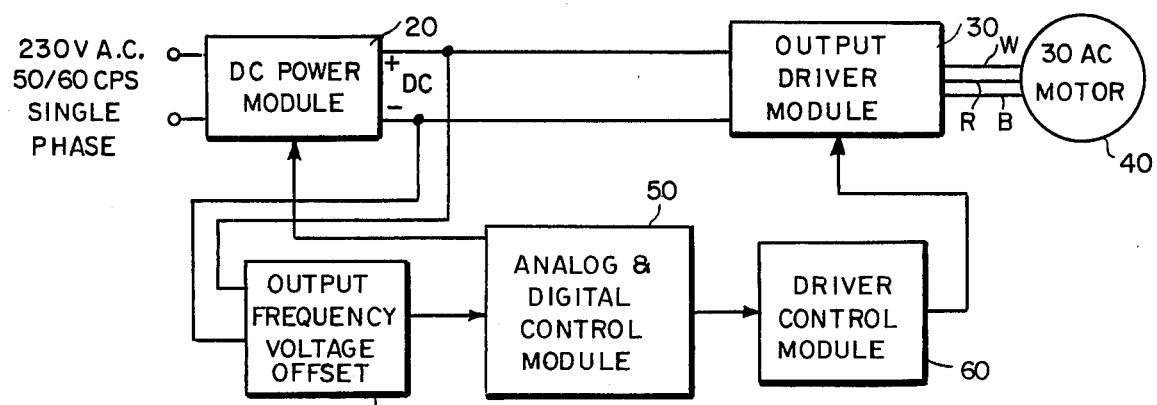
FIG. 1 is a block diagram of the motor control system.

Reference should now be had to FIG. 1 which discloses a block diagram of a motor speed control system of this invention. The preferred embodiment of the invention converts normal 50 to 60 Hz. line power to variable frequency power. Motor speed is directly proportional to the voltage/frequency output of the control system (controller).

At 20 there is shown a DC power module which controls rectifiers of the AC input in accordance with control signals provided by the analog and digital control module 50. The output DC power is applied to an output driver module 30 coupled to a three phase (φ) AC motor 40. The output driver 30 is controlled by driver control signals provided by driver control module 60 which in turn is controlled by the analog and digital control module 50. At 70 there is shown a block for causing the controller to provide an offset voltage to overcome the voltage produced by the action of the voltage offset control and the wide range boost control in the control module allows initial breakaway torque to be developed as well as substantially constant 100% load torque over the entire speed range.

Figure 2:
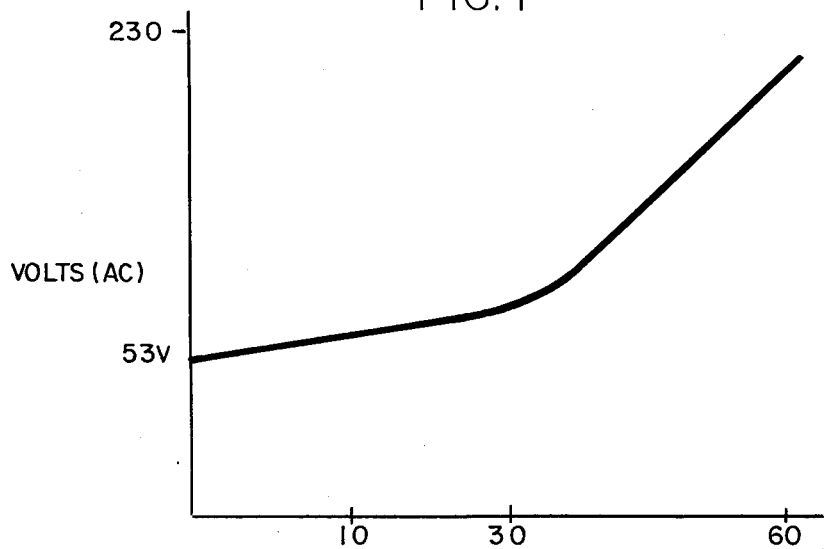
FIG. 2 illustrates the volt/Hz. output curve of the motor control system.

FIG. 2 illustrates the novel volt/Hz. characteristic developed by this speed controller to accomplish the aforementioned.

Figure 3:
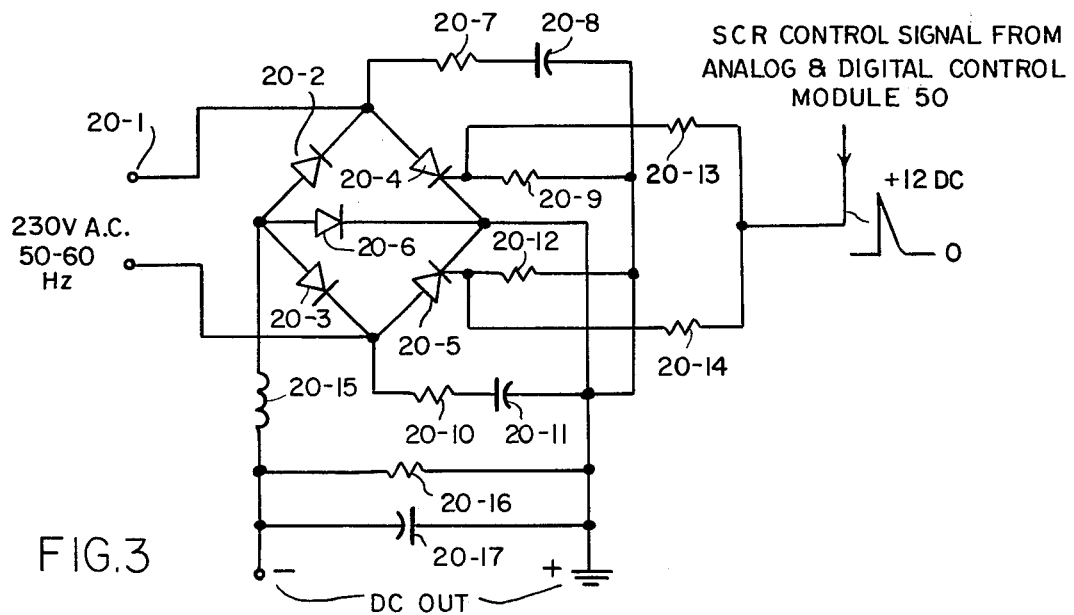
FIG. 3 is a circuit diagram of the DC power module.

Reference should now be had to FIG. 3 for a brief description of the DC power module 20. At 20-1 there is shown an input terminal coupled to a 230 V (50–60 Hz.) AC voltage. The AC voltage is applied to a bridge comprising diodes 20-2 and 20-3, an SCR's (silicone controlled rectifiers) 20-4 and 20-5. A free wheeling diode is shown at 20-6 in order to maintain kickback current low through the choke 20-15. The DC voltage developed by the bridge is filtered by the capacitor 20-17 and the aforementioned choke 20-15. The magnitude of the DC output voltage is controlled in accordance with SCR firing signals applied by control module 50 through current limiting resistors 20-13 and 20-14. The SCR firing signals controls the time of SCR turn-on during the AC cycle when the SCR is forwarded biased. Noise limiting resistors are provided at 20-9 and 20-12 and a bleeder resistor 20-16 is provided across output capacitor 20-17.

Figure 4:
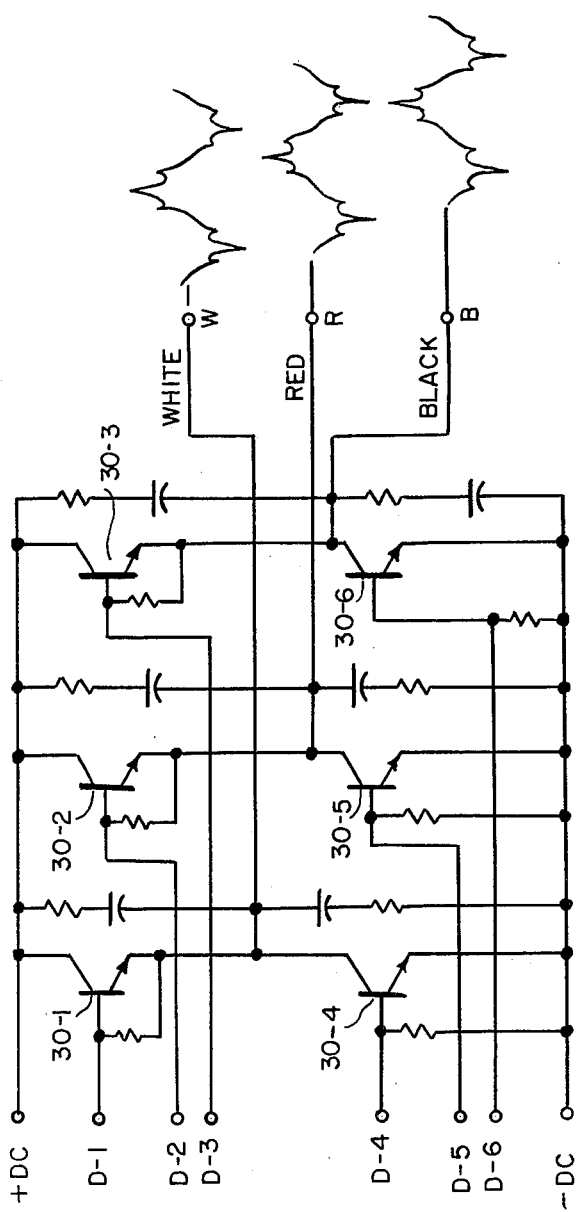
FIG. 4 is a circuit diagram of the output driver module.
Figure 5:
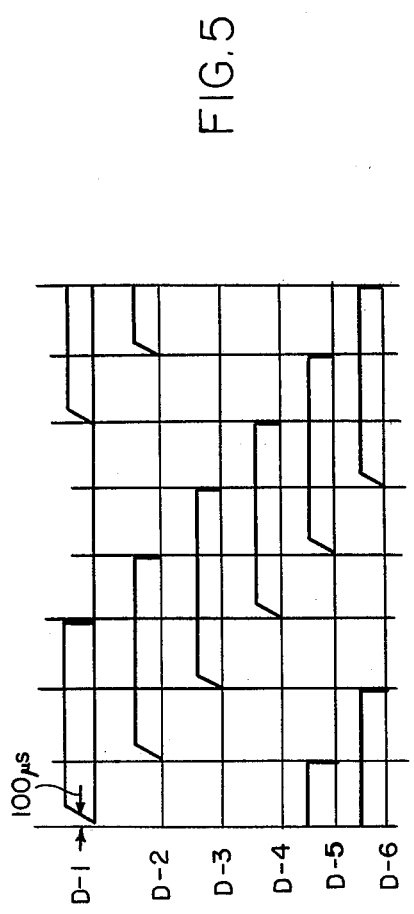
FIG. 5 is a graph illustrating the input control signals D-1 to D-6 applied to the output driver module from the driver control module.

Reference should now be had to FIGS. 4 and 5 which illustrate the output driver module 30 for providing three phase AC power (between 0 to 230 V) to the motor 40, and controls motor speed. FIG. 5 shows the input base waveforms provided to each of the transistors 30-1 to 30-6, to sequentially turn them on to generate the output waveform for each phase of the AC motor 40. A 100 Ms delay is provided in the input control waveforms provided by the driver control module control signals D-1 to D-6 to prevent shorting of the DC bus through opposite toggling transistors. In this manner the turn-off time for each of the transistors is taken into account.

Figure 6:
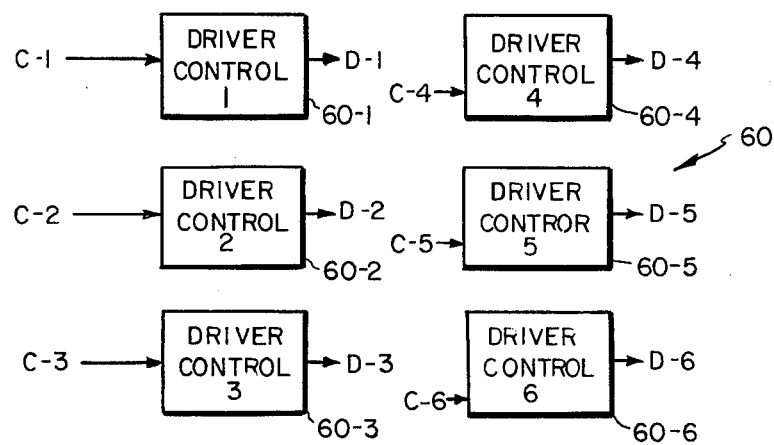
FIG. 6 is a block diagram of the driver control module.
Figure 7:
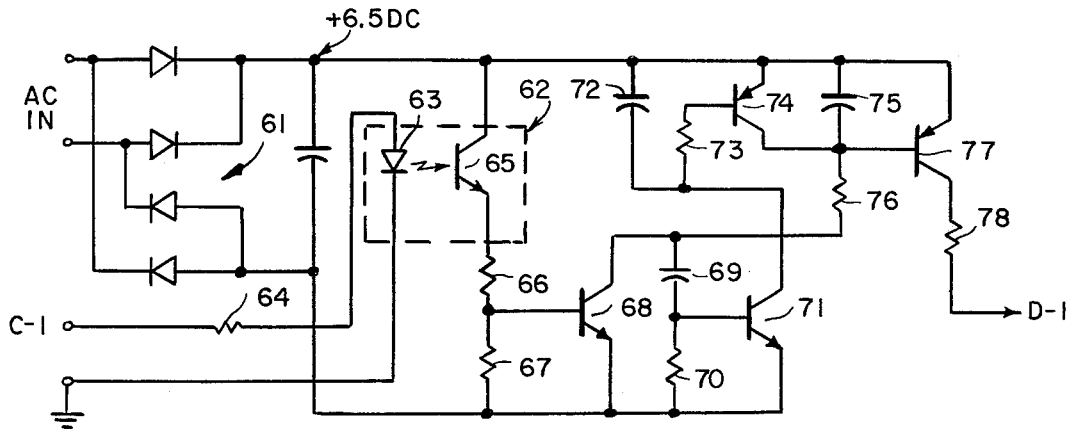
FIG. 7 is a circuit diagram of the driver control 1.
Figure 8:
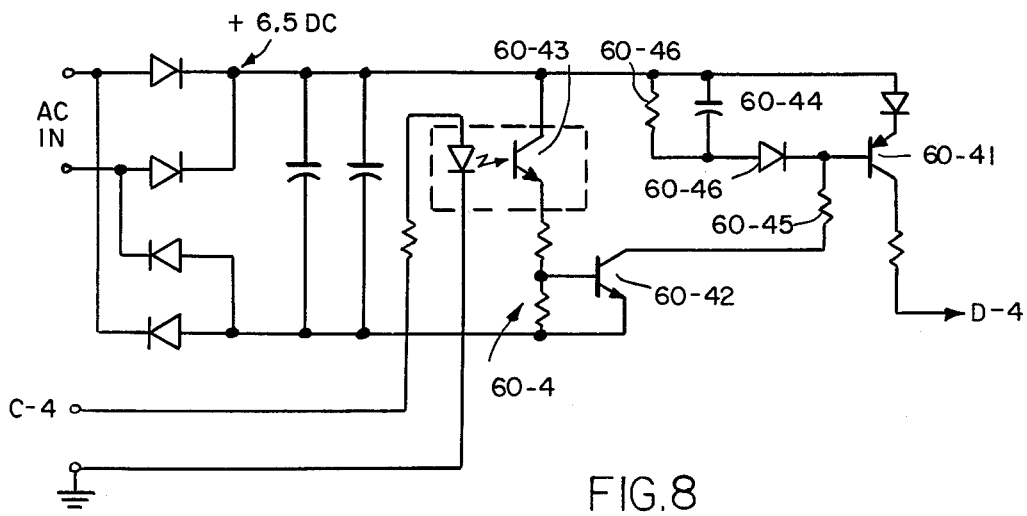
FIG. 8 is a circuit diagram of the driver control 4.

Reference should now be had to FIGS. 6, 7, and 8 which illustrate the driver control module 60. The driver control module 60 includes three identical circuits as shown in blocks 60-1, 60-2, 60-3 as representatively illustrated by FIG. 7 which shows the circuit for 60-1. The driver control module also includes three other identical circuits as shown in blocks 60-4, 60-5 and 60-6 and representatively illustrated by FIG. 8 which shows the circuit for 60-4.

In FIG. 7, when a control signal C-1 is applied (goes high) from the control module 50, it causes a light emitting diode 63 in an opto isolator unit 62 to turn on and thus saturate phototransistor 65. This causes transistor 68 to turn on, which discharges capacitor 69 (previously charged to the supply voltage). At this time capacitor 75 charges to turn on transistor 77. The charging of the capacitor 75 produces the 100 us delay in transistor 77 turn on. The output of transistor 77 is applied through resistor 78 to the base input of transistor 30-1. The DC supply voltage is generated by the diode matrix 61. Resistor 64 acts as a current limitator and resistors 66 and 67 act as a voltage divider. Resistor 70 acts as a base clamp and 73 and 76 are base resistors.

When control signal C-1 goes to ground, photo transistor 65 turns off thus allowing capacitor 69 to begin charging which turns on transistor 71 which in turn charges capacitor 72 and turns on transistor 74. At this time capacitor 75 discharges and turns transistor 77 off.

In FIG. 8 there is shown the driver control circuit 60-4 which is identical with 60-5 and 60-6. In this circuit a control signal C-4 going high causes photo transistor 60-43 and transistor 60-42 to conduct and thus causing capacitor 60-44 to charge, through resistor 60-45 and diode 60-46. The diode 60-46 acts as a fixed offset to generate the 100 us delay for D-4. Turn off occurs when transistor 60-42 is turned off and diode 60-46 becomes reverse biased. At this time capacitor 60-44 discharges through resistor 60-46.

Figure 9:
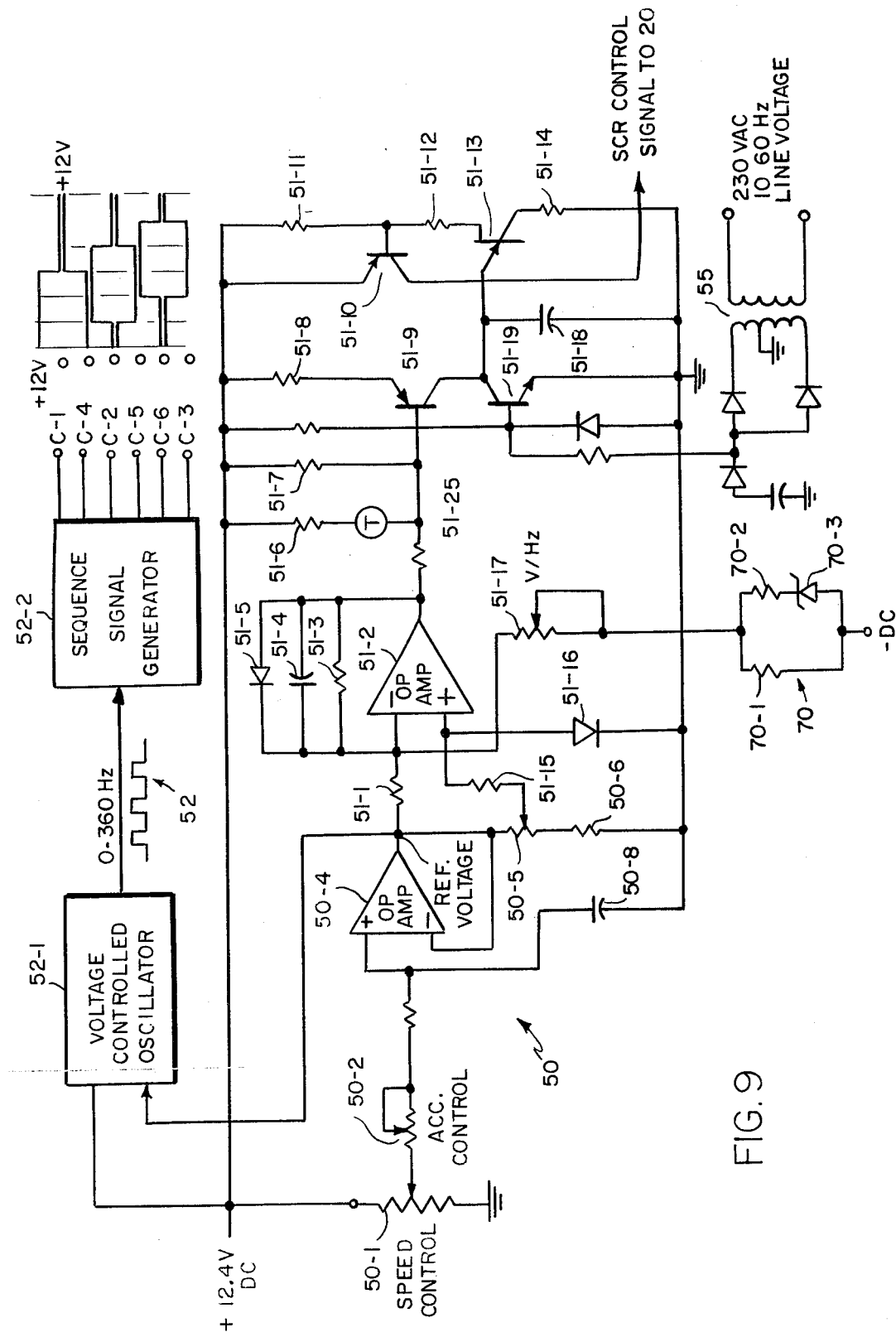
FIG. 9 is a partial block and circuit diagram of the analog and digital control module and the output frequency voltage offset.
Figure 10:
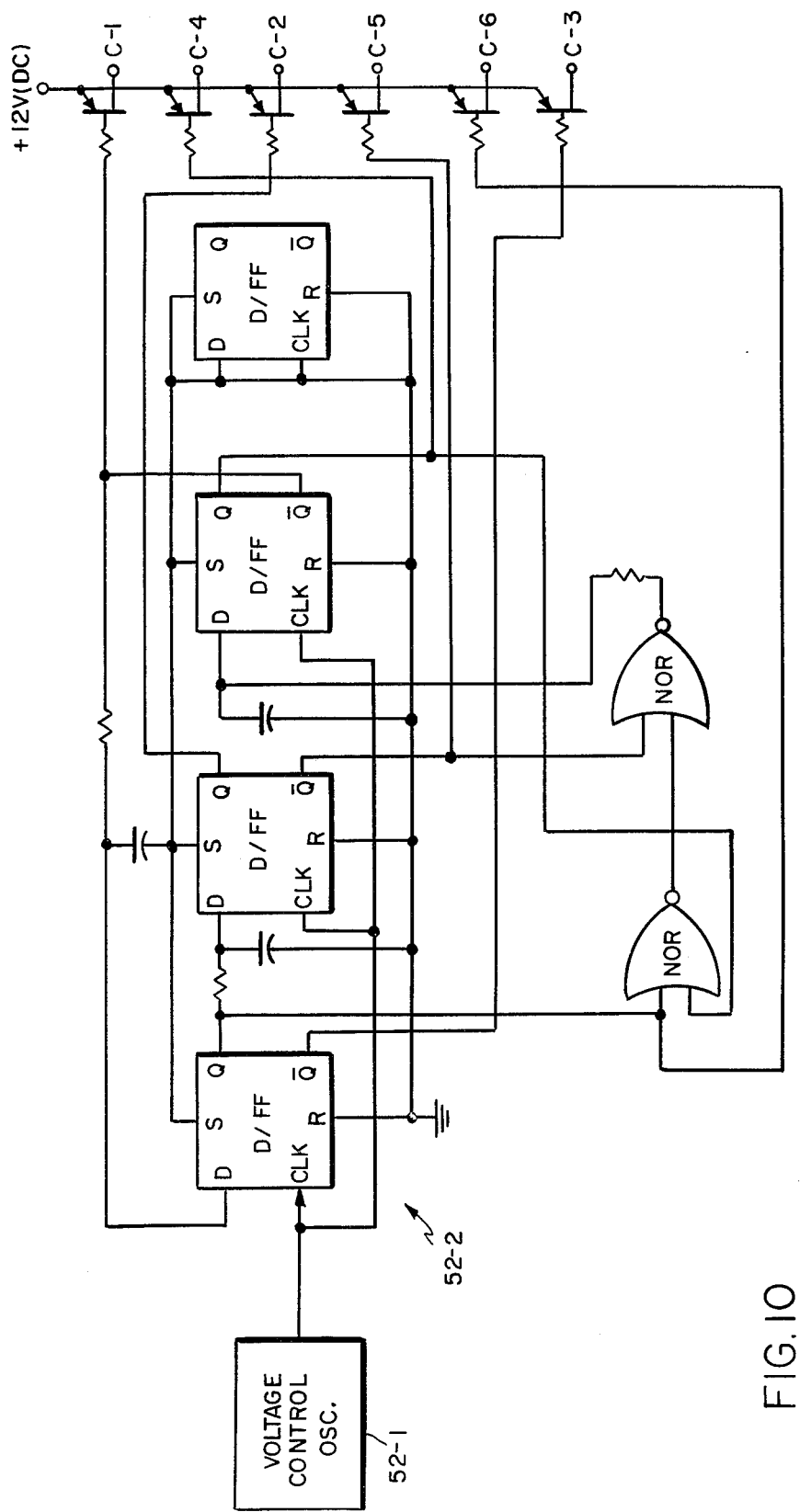
FIG. 10 is a block diagram of the sequence signal generator shown in FIG. 9.

Reference should at this time be had to FIGS. 9 and 10 which illustrate the digital and analog control module 50 and the frequency voltage offset control 70. Assuming that initially the output of the control operational amplifier 51-2 is at 0 volts. The base current of transistor 51-9 is trimmed by resistor 51-25 to provide a constant current to charge capacitor 51-18. Across capacitor 51-18 is transistor 51-19 which is turned on for approximately 500 us each time the line voltage crosses zero. The zero voltage crossover is detected by a zero crossing detector circuit (full wave unfiltered negative power supply) 55 which causes transistor 51-19 to turn on. This causes capacitor 51-18 to discharge and allows a time constant to be set up after the zero crossing has passed. Capacitor 51-18 will charge till the Vp of unijunction transistor 51-13 is reached at which time the base to base impedance of transistor 51-13 goes low causing an offset voltage to overcome the high resistance of fractional horsepower motors. The offset produced by the action of the voltage of said control and the wide range boost control and providing gate pulses to the DC power module 20 (SCR's 20-4 and 20-5).

By increasing the output voltage of op. amp. 51-2 (going more negative) the current through transistor 51-9 increases and causes capacitor 51-18 to charge at a fast rate, causing the SCR's in the DC power module 20 to have a shorter firing angle reflecting in an increase in output voltage.

As the value of the ref. voltage becomes progressively positive (output of 50-4), as speed control 50-1 is adjusted to increase operational speed, a positive voltage is applied to an input of 51-2 in conjunction with a positive voltage being applied to the— inverting input of 51-2. This causes the output of 51-2 to remain at 0 volts until diode 51-16 forward biases. When diode 51-16 forward biases OP amp 51-2 begins providing a negative output signal which in turn as previously explained causes the firing control signals for the SCR's to be provided to module 20.

While the REF. voltage is being increased, a negative voltage from offset control 70 is summed with the positive REF. voltage and causes the output 51-2 to be less negative than without offset control 70.

Across op. amp, 51-2 the provided feedback 51-3, filter capacitor 51-4 and reverse voltage diode 51-5. Resistor 51-6 and thermistor (T) act as thermal base current offset to transistor 51-9. Resistor 51-7 acts as base clamp resistor and resistor 51-8 is an emitter current limiting resistor. Resistor 51-11 is a base clamp resistor and resistor 51-12 limits the base current to transistor 51-10. Pot 51-17 is a volts/Hz. adjustment which controls the amount of negative feedback thereby adjusting output voltage at a given frequency, as shall be hereinafter explained. The acceleration control controls both acceleration and deceleration by setting charging time of capacitor 50-8.

As the speed pot 50-1 is adjusted to increase motor speed from 0 RPM, the op amp 50-4 generates a linear positive voltage over the range of 0 to 10 volts. This causes a REF voltage at the output thereof which controls both the voltage to the SCR's of module 20 and the frequency of the signals C-1 to C-6 provided by voltage controlled oscillator 52-1 and sequence signal generator 52-2.

As the REF voltage continues to increase (above 0) the diode 51-16 conducts which in turn causes op amp 51-2 to operate in an active mode because prior to that time a changing positive voltage was present on the + input of 51-2 which forced the output positive, forward biasing diode 51-5, and forcing the output of 51-2 to remain at about +0.6 V.

As the voltage from 51-2 begins going more negative, signals are provided to the SCR's of module 20—which create a negative DC voltage to the input of offset circuit 70. This negative DC voltage is fedback to the— input of op amp 51-2 and summed with REF voltage via resistor 51-1. The summed voltage in turn regulates the signals to SCR's of module 20. During low voltage conditions Zener 70-3 is held off (non-conducting) thereby the voltage feedback is via resistor 70-1 and 51-17. As the voltage level (− DC) rises large enough to cause conduction of zener 70-3 overal resistance of the network 70 (70-1, 70-2, 70-3) decreases thereby increasing negative feedback. Accordingly until Zener diode 70-3 conducts, the SCR's of module 20 cause a greater voltage to be supplied to the motor so as to overcome high resistance at low speeds. As the output voltage to the motor increases, Zener diode conducts, thereby changing the rate of rise of the output voltage with respect to the frequency. Returning to the volts per hertz (V/Hz.) characteristic, FIG. 2 illustrates the change in rate of rise of the curve as the Zener diode 70-3 conducts. Note the break point at about 25 Hz. Thus circuit 70 provides an output voltage offset to generate the necessary current to overcome resistance of motors at low motor speeds (note motor speed is directly proportional to output signal frequency provided to the motor windings.)

At the same time resistors 50-5 (boost adjust pot) and resistor 51-15 in conjunction with diode 51-16 act as a boost circuit which allows the motor 40 to generate breakaway torque. The level of the reference voltage which causes diode 51-16 to conduct can be adjusted by boost pot 50-5 thereby adjusting the amount of signal applied to op. amp. 51-2 without effecting the voltage level applied to voltage controlled oscillator 52-1. In essence the pot 50-5 permits an output voltage from op. amp. 51-2 to be generated earlier than would occur if the speed control were manually adjusted.

The voltage controlled oscillator 52-1 is conventional (eg on RCA-DC 4046AE) produces pulses at a rep rate proportional to voltage. These pulses as shown in FIG. 10 are applied to four D type flip flops which are connected to two NOR circuits as shown to generate signals to turn on transistors (PNP) providing output control signal C-1 to C-6 (See FIG. 9).

I claim:
1. A motor speed control system comprising:
  (a) an output module for generating an output waveform having a selected amplitude to frequency characteristic, and for applying said waveform to the motor,
  (b) a power module having an output electrically connected to the output module, said power module including a rectifier for converting an alternating voltage input substantially into a direct voltage output, said rectifier having means for controlling the amplitude of said direct voltage output in response to said firing signal, wherein said output waveform's characteristic is dependent on the amplitude of said direct voltage output;
  (c) control means including a first circuit having means for switching resistance into and out of the control means depending on the amplitude of said direct voltage output, and a second circuit having an output electrically connected to the voltage controlling means of the power module for varying the firing signal in association with the changes in resistance of the first circuit, said first circuit being electrically connected between an output of said power module and an input of said second circuit; whereby said output module, being responsive to the control means, provides an output waveform which increases with frequency from a non-zero value gradually up to a break point and more rapidly beyond the break point, and
  (d) wherein the first circuit of the control means comprises a parallel arrangement of a resistor and a diode, said parallel arrangement being connected in series between the direct current output of said power module and said second circuit of said control means.

2. The motor speed control system of claim 1 wherein the power module includes an inverter for generating a three phase waveform, and wherein said system further comprises means for controlling the frequency of said waveform, said frequency controlling means including a sequence signal generator for producing a set of timing signals for said output module, and a voltage controlled oscillator for producing a regulated voltage having a frequency proportional to the amplitude of a direct voltage input to said oscillator, said sequence signal generator being electrically connected between the voltage controlled oscillator and the power module.

3. The motor speed control system of claim 1 further comprising manually adjustable means for at once controlling both (a) the amplitude of direct voltage input to said oscillator, and (b) the amplitude of direct voltage input to the control means.

4. The motor speed control system of claim 1 wherein the control means further includes a manually adjustable means for changing the firing signal so as to additionally increase the amplitude of the waveform for frequencies in the lower part of the first range of frequencies and thereby generate greater breakaway torque.

5. The motor speed control system of claim 1 wherein the diode is a Zener diode.

6. A motor speed control system comprising:
  (a) an output module for generating an output waveform having a selected amplitude to frequency characteristic, and for applying said waveform to the motor,
  (b) a power module having an output electrically connected to the output module, said power module including a rectifier for converting an alternating voltage input substantially into a direct voltage output, said rectifier having means for controlling the amplitude of said direct voltage output in response to said firing signal, wherein said output waveform's characteristic is dependent on the amplitude of said direct voltage output;
  (c) control means including a first circuit having means for switching resistance into and out of the control means depending on the amplitude of said direct voltage output, and a second circuit having an output electrically connected to the voltage controlling means of the power module for varying the firing signal in association with the changes in resistance of the first circuit, said first circuit being electrically connected between an output of said power module and an input of said second circuit; whereby said output module, being responsive to the control means, provides an output waveform which increases with frequency from a non-zero value gradually up to a break point and more rapidly beyond the break point;
  (d) wherein the control means further includes a timing circuit to regulate the time during each cycle of a sixty cycle voltage when said firing pulse is generated, and
  (e) wherein the timing circuit includes a capacitor having a predetermined charging rate, means for controlling the voltage applied across said capacitor, and a zero crossing detector to trigger the beginning of each cycle; and wherein the control means further includes a unijunction transistor through which said capacitor discharges, whereby said zero crossing-detector triggers the discharge of the capacitor at the correct time during each cycle and allows a time constant to be established after each cycle, and said discharge continues across said transistor until the Vp of the transistor is reached at which time the firing pulse is sent to the power module.

7. A motor speed control system comprising:
  (a) an output module for generating an output waveform having a selected amplitude to frequency characteristic, and for applying said waveform to the motor,
  (b) a power module having an output electrically connected to the output module, said power module including a rectifier for converting an alternating voltage input substantially into a direct voltage output, said rectifier having means for controlling the amplitude of said direct voltage output in response to said firing signal, wherein said output waveform's characteristic is dependent on the amplitude of said direct voltage output;

(c) control means including a first circuit having means for switching resistance into and out of the control means depending on the amplitude of said direct voltage output, and a second circuit having an output electrically connected to the voltage controlling means of the power module for varying the firing signal in association with the changes in resistance of the first circuit, said first circuit being electrically connected between an output of said power module and an input of said second circuit; whereby said output module, being responsive to the control means, provides an output waveform which increases with frequency from a non-zero value gradually up to a break point and more rapidly beyond the break point, and (d) wherein the control means further includes an operational amplifier having a positive and a negative input terminal, said operational amplifier connected between the first and second circuits; and wherein said first circuit includes a Zener diode, and a resistor connected in parallel with the Zener diode; and wherein the first circuit is connected between the direct current output from the power module and said operational amplifier.

8. The motor speed control system of claim 7 further including a manually adjustable potentiometer, and wherein the first circuit is connected between the negative direct current output and the negative terminal, and the potentiometer is connected between the positive direct current output and the positive terminal, whereby during lower voltage conditions the Zener is non-conducting and voltage feedback is through the resistor, and as the negative voltage level rises, the Zener diode conducts, the resistance of the first circuit decreases, and the voltage output from the operational amplifier decreases.

* * * * *